(12) United States Patent
Veronesi et al.

(10) Patent No.: US 10,421,544 B2
(45) Date of Patent: Sep. 24, 2019

(54) SYSTEMS AND METHODS FOR POSITIONING A HOIST AND HOOK

(71) Applicant: Rosemount Aerospace Inc., Burnsville, MN (US)

(72) Inventors: William A. Veronesi, Hartford, CT (US); Alan Matthew Finn, Hebron, CT (US); Zohaib T. Mian, Natick, MA (US); Stephen E. Tongue, Hampden, MA (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 74 days.

(21) Appl. No.: 15/443,802

(22) Filed: Feb. 27, 2017

(65) Prior Publication Data

US 2017/0291707 A1 Oct. 12, 2017

Related U.S. Application Data

(60) Provisional application No. 62/320,112, filed on Apr. 8, 2016.

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *B64D 1/22* | (2006.01) | |
| *B64C 19/00* | (2006.01) | |
| *B66C 13/18* | (2006.01) | |
| *B66C 23/18* | (2006.01) | |
| *B66D 1/60* | (2006.01) | |

(Continued)

(52) U.S. Cl.
CPC ............. *B64D 1/22* (2013.01); *B64C 19/00* (2013.01); *B66C 13/085* (2013.01); *B66C 13/18* (2013.01); *B66C 13/46* (2013.01); *B66C 23/18* (2013.01); *B66D 1/60* (2013.01)

(58) Field of Classification Search
CPC .. B64D 1/22; B66C 1/40; B66C 13/40; B66C 13/085; B66C 13/18; B66C 13/46; B66C 23/18; B64C 19/00; B66D 1/60
USPC ............... 701/3; 254/323; 414/626; 212/276
See application file for complete search history.

(56) References Cited

U.S. PATENT DOCUMENTS

| | | | |
|---|---|---|---|
| 3,946,971 A | 3/1976 | Chadwick | |
| 8,840,355 B1 * | 9/2014 | Kulesha | B64D 1/22 414/626 |

(Continued)

FOREIGN PATENT DOCUMENTS

| | | |
|---|---|---|
| DE | 2536694 | 3/1976 |
| DE | 102005006936 | 8/2006 |

OTHER PUBLICATIONS

EP Search Report dated Aug. 22, 2017 in EP Application No. 17165251.4.

*Primary Examiner* — Mahmoud S Ismail
(74) *Attorney, Agent, or Firm* — Snell & Wilmer, L.L.P.

(57) ABSTRACT

Systems and methods for operating a hoist and hook assembly may determine a position of a target using a position sensor. A hook assembly may be positioned in response to the position of the target as detected by the position sensor. Positioning the hook assembly may include articulating a boom coupled to a hoist, using one or more local thrust sources on the hook assembly, and/or moving an airframe relative to the position of the target.

6 Claims, 7 Drawing Sheets

(51) Int. Cl.
  *B66C 13/08* (2006.01)
  *B66C 13/46* (2006.01)
  *B66D 1/00* (2006.01)
  *B65G 47/90* (2006.01)
  *B66C 13/16* (2006.01)

(56) References Cited

U.S. PATENT DOCUMENTS

| | | |
|---|---|---|
| 2013/0054054 A1 | 2/2013 | Tollenaere |
| 2014/0070153 A1* | 3/2014 | Lin .......................... B66C 1/40 254/323 |
| 2016/0031683 A1* | 2/2016 | Fenker .................... B66C 13/40 212/276 |

* cited by examiner

SYSTEMS AND METHODS FOR POSITIONING A HOIST AND HOOK

CROSS-REFERENCE TO RELATED APPLICATIONS

This application is a nonprovisional of, and claims priority to, and the benefit of U.S. Provisional Application No. 62/320,112 entitled "SYSTEMS AND METHODS FOR POSITIONING A HOIST AND HOOK" and filed on Apr. 8, 2016, which is hereby incorporated by reference in its entirety.

FIELD

The disclosure relates generally to hoist and hook assemblies for moving loads, and more particularly, to systems and methods for positioning hoists and/or hooks.

BACKGROUND

Hoists may be used to apply pulling force through a cable or other lifting medium to a load. Hoists and hooks are used in various vertical applications including, for example, cranes and aircraft mounted rescue hoists. Hoists may typically have a hook at the end of a cable that is attachable to the load. During operation, a hook may be lowered and directed to a target to retrieve an item or may be lowered toward a target and released to emplace a load at a target location. Moving the hook to a target may involve manual processes such as a pilot moving the helicopter from which the hoist is being operated.

Rescue conditions and other hoist operation at sea may include tidal variations and uneven sea levels associated with waves. A target in such an operation may be moving in a complex fashion in response to the undulating sea surface.

Furthermore, the hook at the end of a cable may move with a delay relative to the motion of the hoist at the top of the cable or the structure to which the hoist is attached. Thus, a pilot may move a helicopter, for example, in an attempt to deliver the hook to a target only for the target to shift before the hook is positioned.

SUMMARY

A hoist and hook system is provided. The system includes a hoist, a cable coupled to the hoist, and a hook assembly coupled to the cable. The hook assembly may also include a position sensor configured to detect a position of a target.

In various embodiments, the system may include a communication device in electronic communication with the position sensor. A boom may be coupled to the hoist and configured to articulate in response to the position of the target. One or more local thrust source may be coupled to the hook assembly. An airframe may be coupled to the boom or hoist. The airframe may be configured to reposition in response to the position of the target. The hook assembly may further comprise a compass configured to detect a rotational orientation of the hook assembly. A tracking system may be in communication with the position sensor.

A method of operating a hoist and hook assembly is also provided. The method may include the steps of determining a position of a target using a position sensor, positioning a hook assembly in response to the position of the target. The system may deliver the hook assembly to the target.

In various embodiments, the position of the target may be determined in real-time. The position of the target may also be a future position projected based on a real-time position of the target and/or a past position of the target. The real-time position data may be captured and processed at a rate sufficient to maintain stability of a control system that uses the input data for a control process. A controller may project a future position of an airframe coupled to the boom or hoist. Positioning the hook assembly may include repositioning the airframe in response to the position and/or predicted position of the target. Positioning the hook assembly may also include instructing one or more local thrust sources to position the hook assembly. Positioning the hook assembly may further comprise articulating a boom coupled to the hoist assembly to reposition the hoist assembly.

An article of manufacture is also provided. The article may include a non-transitory, tangible computer readable storage medium having instructions stored thereon that, in response to execution by a processor, cause the processor to perform operations. The operations may include determining a real-time position of a target using a position sensor, positioning a hook assembly coupled to a hoist assembly by a cable at least partially in response to the real-time position of the target, and delivering the hook assembly to the target.

In various embodiments, the operations may include positioning the hook assembly at least partially in response to a future position of the target projected using a model based at least partially on the real-time position of the target. The operations may also include projecting a future position of an airframe coupled to the boom or hoist assembly, and positioning the hook assembly at least partially in response to the future position of the airframe. The operations may further include projecting a future position of the hook assembly and positioning the hook assembly at least partially in response to the length and characteristics such as linear mass and stiffness of the deployed cable. Positioning the hook assembly may further include instructing one or more local thrust sources to position the hook assembly and/or articulating a boom coupled to the hoist assembly to reposition the hoist assembly. The operations may also include tracking the target using a tracking system based on at least one of Cartesian coordinates, polar coordinates, spherical coordinates, or cylindrical coordinates.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, electronic, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Hoist and hook systems of the present disclosure may position a hoist assembly and/or a hook assembly based on the detected and/or projected position of a target. The terms position and location may be used herein interchangeably. A target may be identified using an electromagnetic or acoustic sensor mechanically coupled to the hoist assembly and/or hook assembly. The target's position may then be tracked and/or projected relative to the perspective of the hoist assembly, hook assembly, and/or structure to which the hoist is mounted. The hoist assembly and/or hook assembly may then be positioned based on the position and/or projected position of the target to deliver the hook assembly to the target.

In various embodiments, one or more electromagnetic or acoustic sensors may be mechanically mounted on the airframe and/or on detached structures such as deployed buoys, fixed buoys, other aircraft, nearby ships, and the like, provided that the one or more sensors may individually or collectively provide equivalent information such that the relative position of the target from the hoist assembly, hook assembly, or airframe may be computed. Such detached or displaced sensors may be especially useful when the view of the target from the hoist assembly is obscured as may happen with a sling load.

Figure 1:
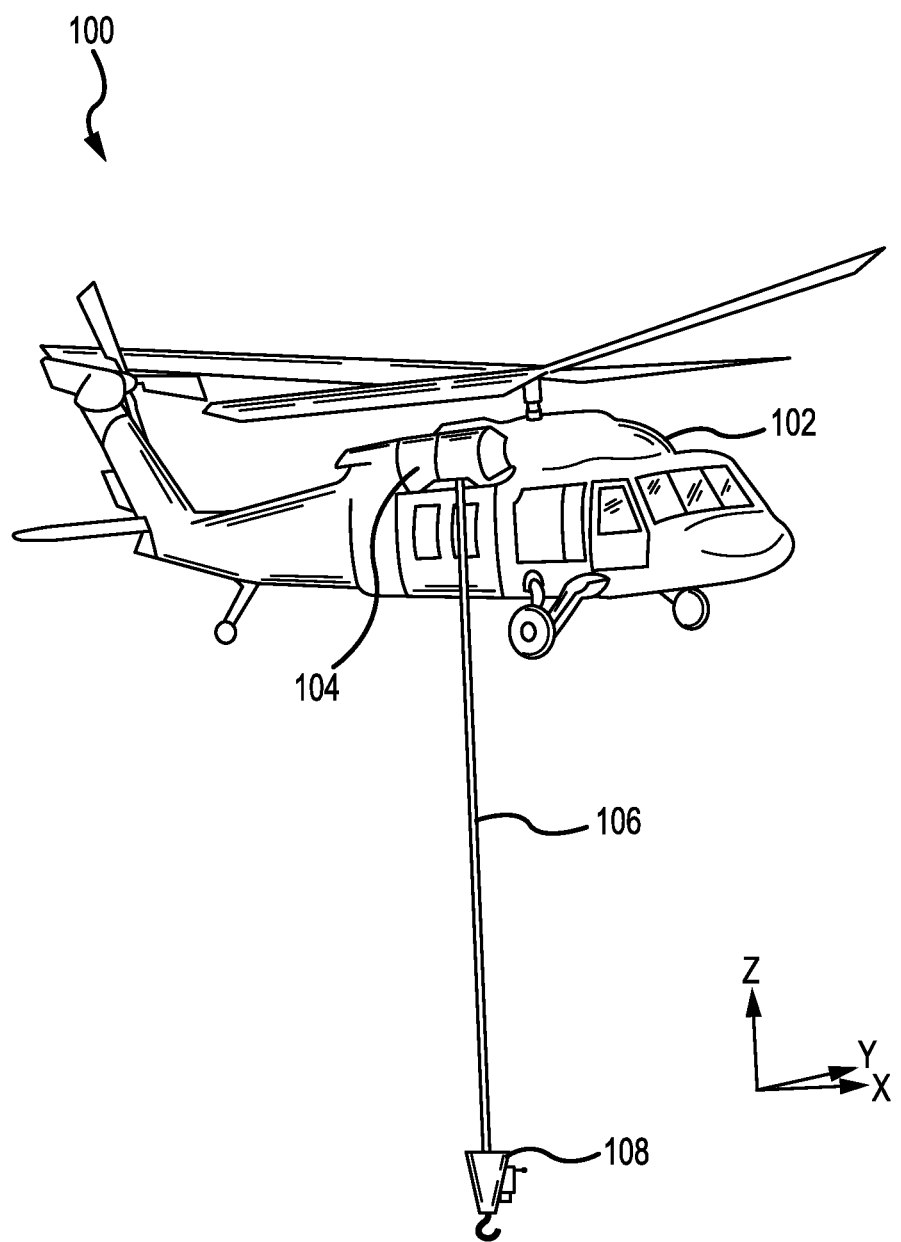
FIG. 1 illustrates an exemplary hoist assembly and hook assembly mechanically coupled to an aircraft for positioning the hoist assembly and/or hook assembly, in accordance with various embodiments.

Referring now to FIG. 1, an exemplary hoist and hook system 100 is shown, in accordance with various embodiments. Hoist and hook system 100 includes an airframe 102 mechanically coupled to a hoist assembly 104. Hoist assembly 104 may be coupled directly to airframe 102 or mechanically coupled to a boom that is mechanically coupled to airframe 102. Cable 106 may be wound about a drum within hoist assembly 104 and released or retracted based on rotation of the drum. Cable 106 may thus hang at various distances from hoist assembly 104 and airframe 102. A hook assembly 108 may be coupled to cable 106 at the free end of the cable opposite hoist assembly 104. Hook assembly 108 may hang from hoist assembly 104 on cable 106. Cable 106 and hoist assembly 104 may thus swing and/or translate relative to hoist assembly 104 and airframe 102. The position of hoist assembly 104 may be controlled in part by changing the position of hoist assembly 104 and/or airframe 102.

Figure 2:
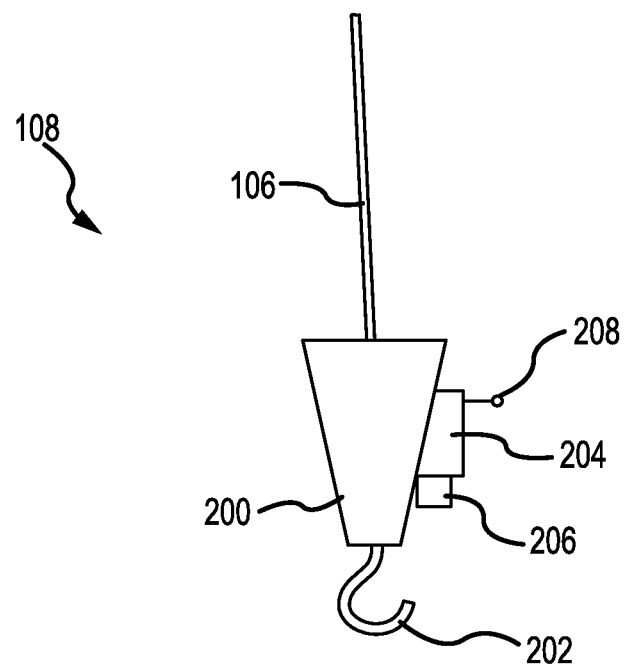
FIG. 2 illustrates a hook assembly having a sensor configured to detect the position of a target, in accordance with various embodiments.

Referring now to FIG. 2, hook assembly 108 is shown coupled to an end of cable 106, in accordance with various embodiments. Hook assembly 108 may be configured to detect the position of a target. Hook assembly 108 may include body 200. Hook interface 202 may extend from body 200 opposite cable 106. Hook interface 202 may be configured for attachment to a load to hoist the load on cable 106. Hook interface 202 may be manually operable or may be remotely operable to facilitate engagement and disengagement without manual assistance at the target site. Hook assembly 108 may further include systems such as a compass 204, a position sensor 206, and/or a communication device 208.

In various embodiments, hook assembly 108 may rotate on cable 106 relative to airframe 102 and/or hoist assembly 104 of FIG. 1 about the vertical axis (i.e., the z axis in FIG. 1). Compass 204 may be an electromagnetic compass configured to determine the orientation of hook assembly 108 relative to the cardinal directions. The relative position of hook assembly 108 detected by compass 204 may be compared to the a relative position of airframe 102 and/or hoist assembly 104 relative to the cardinal directions as detected by a similar compass. Thus, compass 204 may be used to determine the orientation of hook assembly 108 relative to airframe 102 and/or hoist assembly 104. Compass 204 may also be an electronic device configured to detect an orientation of hook assembly 108 relative to airframe 102 and/or hoist assembly 104 of FIG. 1 such as, for example, a beacon system comprising two or more beacons on hook assembly 108 or detectable fiducial marks that are used to determine the rotational orientation of hook assembly 108 about cable 106.

In various embodiments, position sensor 206 may comprise a variety of position sensing devices including passive and/or active sensors. For example, position sensor 206 may be an optical position sensor capable of detecting visible light such as, for example, an imaging device or camera. The visible light may be captured in still frame images or video for use in identifying a target, detecting a target's position, and/or projecting a target's future position. In that regard, position sensor 206 may be configured to detect a target without the presence of a beacon on the target. Position sensor 206 may also detect other spectrums of electromagnetic radiation or acoustic pressure waves such as radio, infrared, ultraviolet, ultrasonic, or the like.

In various embodiments, position sensor 206 may additionally be a distance, range, and/or depth sensing device. Such a distance, range, or depth sensor may be operable in the electromagnetic or acoustic spectrum capable of producing a depth map (also known as a point cloud or occupancy grid). Various distance, range, or depth sensing sensor technologies and devices include, but are not limited to, a structured light measurement, phase shift measurement, time of flight measurement, stereo triangulation device, sheet of light triangulation device, light field cameras, coded aperture camera, computational imaging techniques, simultaneous localization and mapping (SLAM), imaging radar, imaging sonar, laser radar, scanning LIDAR, flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc.

In various embodiments, a beacon may be placed on a target to transmit the position of the target to position sensor 206 for position sensor 206 configured to operate on, for example, radio frequencies of electromagnetic radiation. In various embodiments, fiducial marks may have been placed on a target to improve the accuracy of its detection by position sensor 206. Position sensor 206 may be fixedly coupled to hook assembly 108, hoist assembly 104, and/or airframe 102 to detect a position of a target relative to the hook assembly 108, hoist assembly 104, or airframe 102, respectively.

In various embodiments, communication device 208 may be in electronic communication with compass 204 and/or position sensor 206. Communication device 208 may be, for example, a wireless transceiver. Communication device 208 may be configured to transmit and/or receive data to and/or from hook assembly 108. In that regard, communication device 208 may transmit data captured by compass 204 and/or position sensor 206. Communication device 208 may be in electromagnetic communication with a similar communication device on airframe 102 and/or hoist assembly 104. In various embodiments, cable 106 may also be configured to carry electrical power and/or electrical signals between hook assembly 108 and hoist assembly 104.

Figure 3:
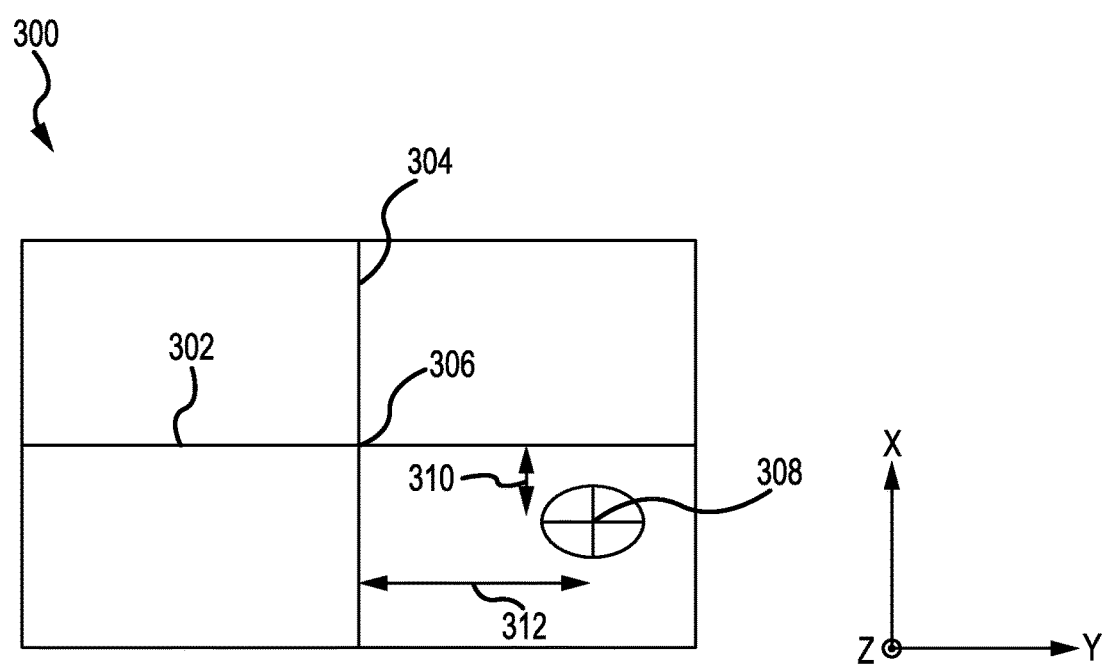
FIG. 3 illustrates an exemplary position map of a target relative to a reference point such as an airframe, a hoist, or a hook, in accordance with various embodiments.

With reference to FIG. 3, an exemplary tracking system 300 is shown, in accordance with various embodiments. Tracking system 300 may implement a Cartesian coordinate system as illustrated with a point 306 located at an intersection between a vertical axis 304 and a horizontal axis 302 that is orthogonal to the vertical axis 304. Although a Cartesian coordinate system is illustrated for tracking system 300, other coordinate systems such as a polar coordinate system, a cylindrical coordinate system, a cubic coordinate system, and/or a spherical coordinate system may be employed by tracking system 300. In that regard, the tracking system may implement a 2-dimensional coordinate system as illustrated or a 3-dimensional coordinate system.

Tracking system 300 may identify the position of target 308 relative to point 306. Point 306 may represent the location of a reference point such as, for example, a location of a position sensor 206 on at least one of airframe 102, hoist assembly 104, and/or hook assembly 108 of FIG. 1 in the x-y plane. In that regard, the orientation of horizontal axis 302 and vertical axis 304 may be fixed relative to at least one of airframe 102, hoist assembly 104, and/or hook assembly 108. Vertical axis 304 may, for example, extend from aft to forward along airframe 102 and horizontal axis 302 may extend across airframe 102 perpendicular to vertical axis 304. Tracking system 300 may also include a depth of the target in a Z direction. The depth may be measured, for example, by a position sensor 206 and/or a length of cable 106 deployed from hoist assembly 104.

For example, tracking system 300 may determine that target 308 is distance 310 from the horizontal axis 302 and distance 312 from the vertical axis 304. The distances may include positive and negative numbers to indicate which side of point 306 the distances lie on their respective axis. The position of target 308 relative to point 306 (i.e., airframe 102, hoist assembly 104, and/or hook assembly 108) may thus be represented by an ordered pair (representing coordinates along the horizontal and vertical axis) or 3-tuple (adding a third coordinate for the z-direction). The relative position of target 308 may be used to issue movement commands to airframe 102, hoist assembly 104, and/or airframe 102 to align hook assembly 108 relative to target 308.

Tracking system 300 may be operated by and executed on a controller. A controller may be, for example, a computer based-system having a processor and memory. A controller may thus include one or more processors and one or more tangible, non-transitory memories and be capable of implementing logic. The processor can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof.

In various embodiments, the processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, the controller may be in electronic communication with a position sensor 206 (of FIG. 2). The controller may, for example, receive a signal from position sensor 206 encoding the position of target 308 (of FIG. 3) relative to point 306 (of FIG. 3). The controller and position sensor 206 may be in electronic communication via, for example, one or more of a wire, a bus, a circuit, a wireless channel, or another suitable electronic communication channel. The controller may transmit control signals to airframe 102, hoist assembly 104, and/or hook assembly 108 of FIG. 1.

Figure 4:
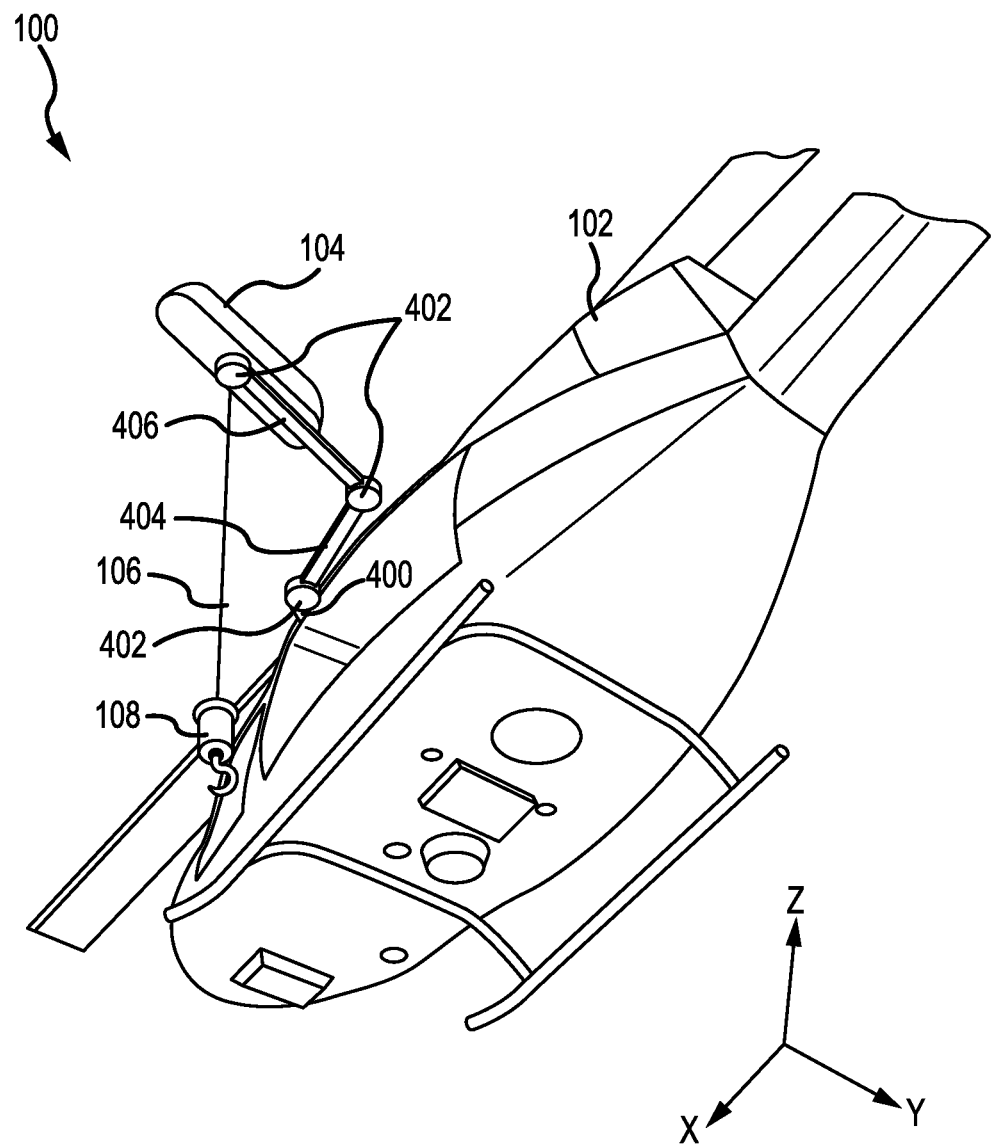
FIG. 4 illustrates an exemplary system for positioning a hoist assembly and/or a hook assembly using an articulating arm or boom, in accordance with various embodiments.

Referring now to FIG. 4, a perspective view of hoist and hook system 100 having a boom 404 capable of articulation is shown, in accordance with various embodiments. Boom 404 may be coupled to airframe 102 at mounting point 400. One or more actuators 402 may be configured to position hoist assembly 104 and/or hook assembly 108 in the x-y plane by articulation of boom 404. The length of cable 106 deployed to hook assembly 108 controls the distance of the hook assembly from airframe 102 substantially in the z-direction.

Referring briefly to FIGS. 3 and 4, tracking system 300 may be used to determine the desired position of hoist assembly 104 and/or hook assembly 108 relative to target 308. For example, tracking system 300 may indicate that boom 404 should be actuated distance 310 in the x direction and distance 312 in the y direction to align hook assembly 108 with target 308 in the x-y plane. Similarly, tracking system 300 may indicate that airframe 102 should move distance 310 in the x direction and distance 312 in the y direction to align hook assembly 108 with target 308 in the x-y plane.

Figure 5:
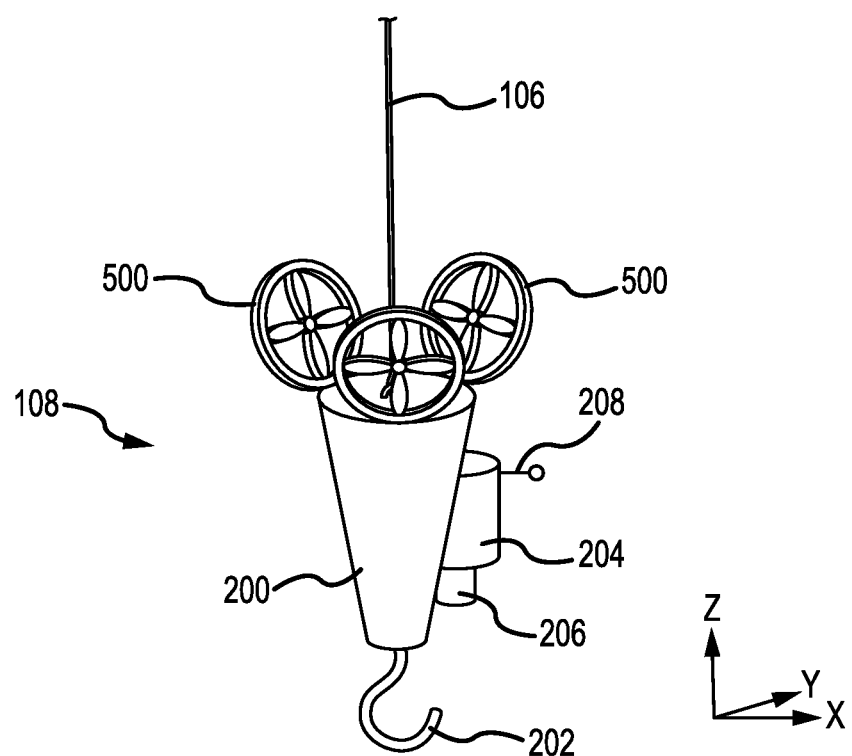
FIG. 5 illustrates an exemplary system for positioning a hook assembly using one or more local thrust sources, in accordance with various embodiments.

With reference to FIG. 5, a hook assembly 108 having one or more local thrust sources 500 is shown, in accordance with various embodiments. Hook assembly 108 may translate in the z direction in response to cable 106 being deployed or retracted and/or movement of airframe 102 in the z direction. Compass 204, position sensor 206, and communication device 208 may be used to identify the position of hook assembly 108 relative to target 308 of FIG. 3. The local thrust sources 500 may be coupled to body 200 of hook assembly 108. The local thrust sources 500 may be configured to translate or rotate hook assembly 108 in the x-y plane. The local thrust sources 500, and/or cable 106, and/or airframe 102 may also be configured to translate hook assembly 108 in the z direction. The one or more local thrust sources 500 may be, for example, electronically powered propellers configured to generate thrust in response to rotation.

Referring briefly to FIGS. 3 and 5, tracking system 300 may be used to determine the desired position of hook assembly 108 relative to target 308. For example, tracking system 300 may indicate that hook assembly 108 should translate distance 310 in the x direction and distance 312 in they direction to align hook assembly 108 with target 308 in the x-y plane. The translation of hook assembly 108 may thus direct hook interface 202 to target 308.

Figure 6:
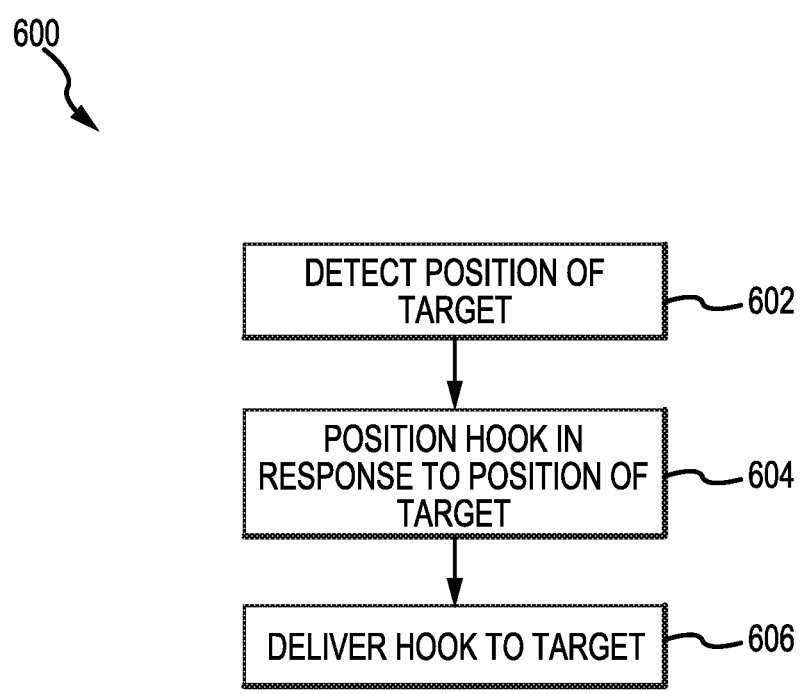
FIG. 6 illustrates an exemplary method for delivering a hook assembly to a target using a detected position of a target, in accordance with various embodiments.

Referring now to FIG. 6, an exemplary process 600 for delivering a hook to a target is shown using hoist and hook system 100 of FIG. 1 and tracking system 300 of FIG. 3 controlled by a computer-based controller, in accordance with various embodiments. The controller may detect a position of a target 308 (Step 602). As described above with reference to FIGS. 2 and 3, the position of target 308 may be detected using tracking system 300 and a position sensor 206. The position may be a position of the target relative to a point such as a hook assembly, hoist assembly, or airframe.

In various embodiments, the controller may position a hook assembly 108 in response to the position of the target (Step 604). The position of the target may be detected by the controller via electronic communication with position sensor 206 using tracking system 300. The position may be identified using a coordinate system and/or a set of movement commands. The position may also be a current position as measured by position sensor 206.

In various embodiments, the controller may then deliver hook assembly 108 to a target (Step 606). The hook assembly may be delivered by transmitting movement commands to an autopilot configured to reposition airframe 102, to the local thrust sources 500 to position hook assembly 108, and/or to boom 404 to position hoist assembly 104. In that regard, airframe 102, hoist assembly 104, and/or hook assembly 108 may be positioned in response to the position of a target 308.

Figure 7:
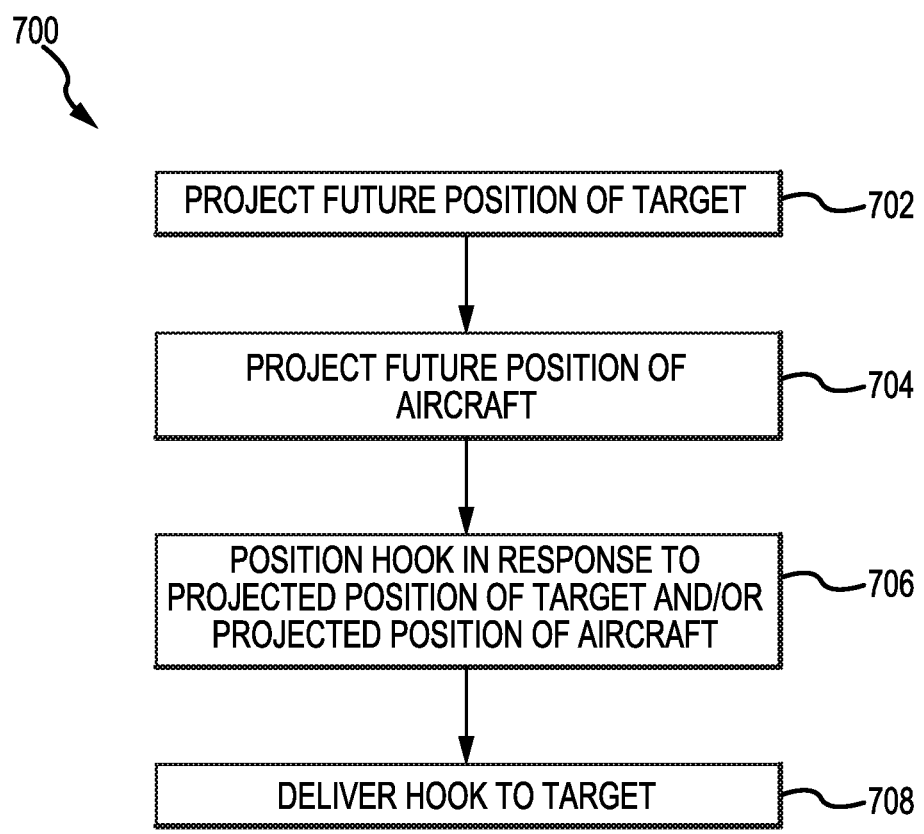
FIG. 7 illustrates an exemplary method for delivering a hook assembly to a target using a projected position of a target, in accordance with various embodiments.

Referring now to FIG. 7, an exemplary process 700 for delivering a hook assembly 108 (of FIG. 1) to a target 308 (of FIG. 3) using a projected position of the target is shown, in accordance with various embodiments. The system may be controlled by a computer-based controller as discussed with reference to FIGS. 3 and 6 above. The controller may project a future position of the target (Step 702). The future position may be projected by detecting and logging positions of the target in real-time. Future positions may be modeled based on previous and/or current positions using modeling or filtering methods such as a Bayesian filter. Suitable Bayesian filters for short-term prediction include Kalman filters and Particle filters. Other motion models, especially those that explicitly include uncertainty of estimated target position, may be used. For instance, the future position of hook assembly 108 may be predicted, in part, on a model of the dynamics of cable 106. Such a model might include the deployed length of cable 106 and characteristics such as linear mass and stiffness of cable 106. Based on the predicted motion of the target and/or hook assembly 108, model-predictive control methods may be used to account for changing behavior of hook assembly 108 and/or target 308.

The controller may also project a future position of the aircraft (Step 704). The future position of the aircraft may be projected independently based on airspeed, past positions, and/or current positions of the aircraft. The future position of the aircraft may also be indirectly projected along with the position of the target, since the position of the target may be projected using a position sensor 206 coupled to airframe 102.

In various embodiments, the controller may position hook assembly 108 in response to the projected position of the target and/or the projected position of the aircraft (Step 706). The controller may position hook assembly 108 directly or indirectly by transmitting movement commands to an autopilot configured to reposition airframe 102, to the one or more local thrust sources 500 to position hook assembly 108, and/or to boom 404 to position hoist assembly 104. The controller may thus deliver the hook assembly 108 to target 308 (Step 708).

Systems and methods of the present disclosure tend to reduce the time to position the hoist free-end (i.e., hook assembly 108), reduce operational risk, and increase the probability of success for rescue operations. Sensors may help to pinpoint the location of a person in need of rescue and/or more precisely place a suspended load. The sensed location may be used to position the various components of hoist and hook system 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hoist and hook system, comprising:
    a hoist;
    a cable coupled to the hoist;
    a hook assembly coupled to the cable;
    a position sensor disposed on one of the hoist or the hook assembly and configured to detect a position of a target, located remote from the position sensor, relative to at least one of the hoist or the hook assembly; and
    a compass disposed on the hook assembly and configured to determine an orientation of the hook assembly relative to the hoist.

2. The hoist and hook system of claim 1, further comprising a communication device in electronic communication with the position sensor.

3. The hoist and hook system of claim 1, further comprising a boom coupled to the hoist, wherein the boom is configured to articulate in response to the position of the target.

4. The hoist and hook system of claim 1, further comprising a local thrust source coupled to the hook assembly.

5. The hoist and hook system of claim 1, further comprising an airframe coupled to at least one of the hoist or a boom coupled to the hoist, wherein the airframe is configured to reposition in response to the position of the target.

6. The hoist and hook system of claim 1, further comprising a tracking system in communication with the position sensor, wherein the tracking system is configured to calculate a relative position of the target and at least one of the hoist and the hook assembly.

* * * * *